A. CAMPBELL.
DUMP CAR.
APPLICATION FILED JAN. 18, 1909.

937,419.

Patented Oct. 19, 1909.
3 SHEETS—SHEET 1.

A. CAMPBELL.
DUMP CAR.
APPLICATION FILED JAN. 18, 1909.

937,419.

Patented Oct. 19, 1909.
3 SHEETS—SHEET 3.

Witnesses:

Inventor
Argyle Campbell
By Munday, Evarts, Adcock & Clarke,
Attorneys

UNITED STATES PATENT OFFICE.

ARGYLE CAMPBELL, OF CHICAGO, ILLINOIS, ASSIGNOR TO ENTERPRISE RAILWAY EQUIPMENT COMPANY, OF CHICAGO, ILLINOIS, A CORPORATION OF ILLINOIS.

DUMP-CAR.

937,419.  Specification of Letters Patent.  Patented Oct. 19, 1909.

Application filed January 18, 1909. Serial No. 472,787.

*To all whom it may concern:*

Be it known that I, ARGYLE CAMPBELL, a citizen of the United States, residing in Chicago, in the county of Cook and State of Illinois, have invented a new and useful Improvement in Dump-Cars, of which the following is a specification.

My invention relates to improvements in dump cars.

The object of my invention is to provide an improved construction of dump car in which the discharge opening may be of greater length longitudinally than the clear space between the car wheels or car wheel axles.

My invention consists in the means I employ to practically accomplish this object or result. That is to say, it consists in connection with a dump car body, the bottom of which preferably has inclined sides and ends and is provided with a discharge opening of greater length longitudinally than the clear space between the car wheels, of three doors for closing said opening, two of which are transversely hinged at the transverse or end edges of the discharge opening, and which partially close said opening, and an intermediate longitudinally hinged door which is hinged at one edge to one of the longitudinal edges of said opening, and which middle or intermediate door extends across the opening from side to side. The longitudinally hinged intermediate door may, if desired, be split transversely of the car into two or more members or sections for convenience of manufacture.

My invention further consists in the novel construction of parts and devices and in the novel combinations of parts and devices herein shown and described.

Figure 1:
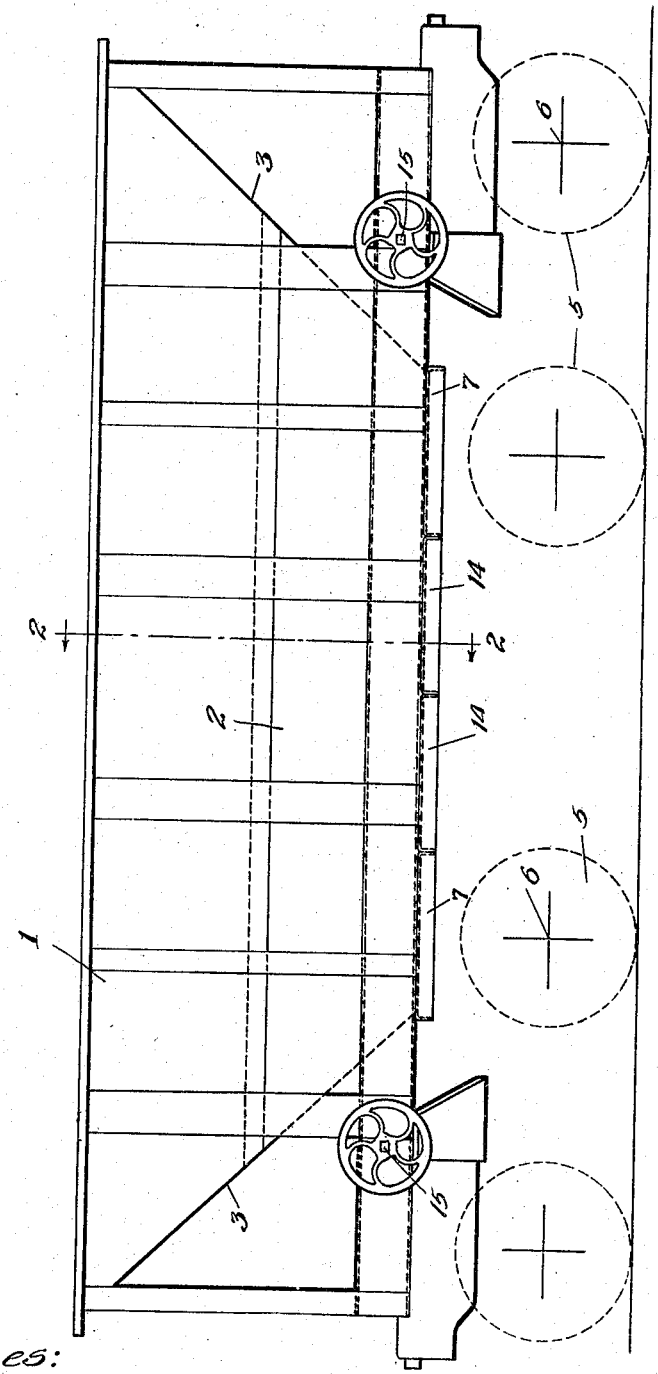
Figure 2:
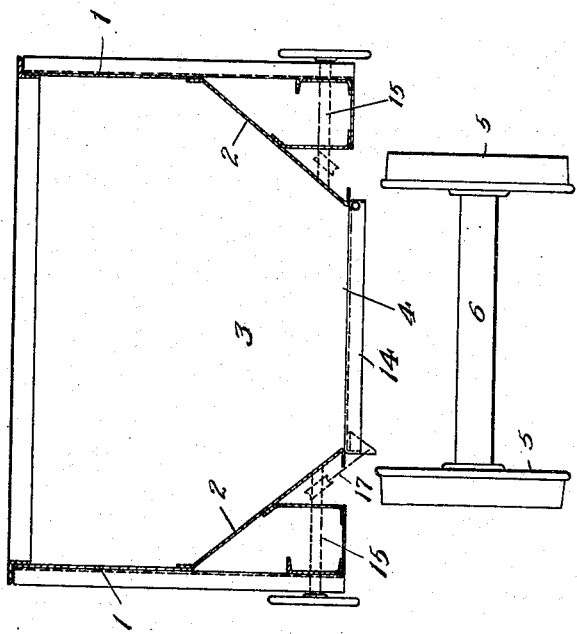
Figure 3:
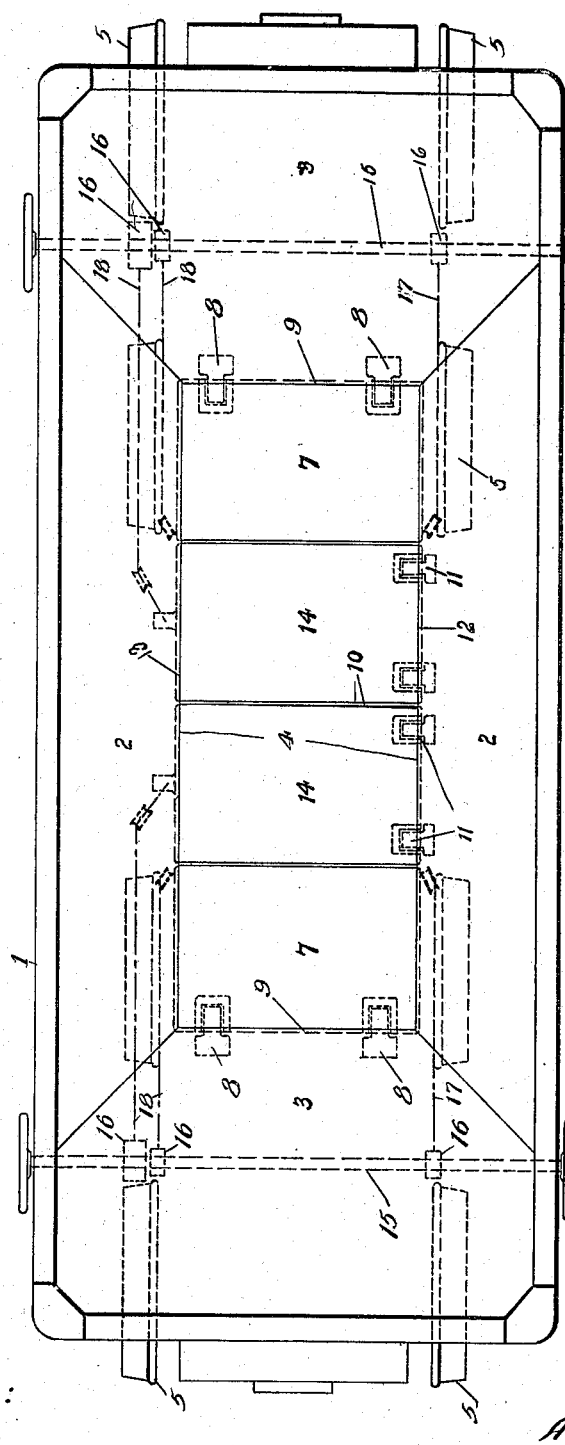

In the accompanying drawing forming a part of this specification, Figure 1 is a side elevation of a dump car embodying my invention. Fig. 2 is a vertical cross section on line 2—2 of Fig. 1 and Fig. 3 is a plan view.

In the drawing, 1 represents a dump car body, the bottom of which is preferably furnished with inclined sides 2, and inclined ends 3 and with a discharge opening 4, and of greater length longitudinally than the clear space between the car wheels 5 or their axles 6. This discharge opening 4 is closed by three doors, two transverse hinged doors 7, 7, each connected to the car body by hinges 8 at one of the outer transverse or end edges 9 of the discharge opening 4. These two transversely hinged doors 7, 7, partially close the discharge opening of the dump car. The remaining portion of the discharge opening 4 is closed by a longitudinally hinged door 10, connected by hinges 11 at one of its ends 12 with the car body adjacent to one of the longitudinal edges 13 of the discharge opening 4. This longitudinally hinged intermediate door 10 extends transversely across the discharge opening from side to side and coöperates with the two transversely hinged doors 7, 7 inclosing the discharge opening. The intermediate longitudinally hinged door 10 may, if desired, be split on a line transverse of the car, into two or more separate sections or members 14 for convenience of manufacture and manipulation. The transversely hinged end doors 7, 7, and the longitudinally hinged intermediate door 10 may be operated or opened and closed by any suitable door operating mechanism. The door operating mechanism which I prefer to employ comprises two transversely extending operating shafts 15, each furnished with winding drums 16 and chains or connections 17, 18 extending to the free or swinging ends of the transversely hinged doors 7, 7 and of the intermediate longitudinally hinged door 10.

I claim:—

1. In a dump car, the combination with a car body having a discharge opening of greater length than the clear space between the car wheels, of two transversely hinged doors partially closing said discharge opening, and an intermediate longitudinally hinged door hinged at one longitudinal edge of said discharge opening and extending across the same to the other edge thereof, and closing the intermediate portion of said opening, substantially as specified.

2. In a dump car, the combination with a car body having a discharge opening of greater length than the clear space between the car wheels, of two transversely hinged doors partially closing said discharge opening, and an intermediate longitudinally hinged door hinged at one longitudinal edge of said discharge opening and extending across the same to the other edge thereof and closing the intermediate portion of said opening, and operating mechanism for opening and closing said doors, substantially as specified.

3. In a dump car, the combination with a car body having a discharge opening of greater length than the clear space between the car wheels, of two transversely hinged doors partially closing said discharge opening, and an intermediate longitudinally hinged door hinged at one longitudinal edge of said discharge opening and extending across the same to the other edge thereof and closing the intermediate portion of said opening, said intermediate door being split into two members, both of which are hinged at one and the same longitudinal edge of said discharge opening, and both of which extend entirely across said discharge opening from side to side, substantially as specified.

4. In a dump car, the combination with a car body having a discharge opening in the bottom thereof, of two doors partially closing said opening hinged to the car body at opposite parallel edges of said opening, and an intermediate door extending entirely across said opening and hinged to the car body at an edge of said opening which is at right angles to the hinged edges of said two first mentioned doors, substantially as specified.

5. In a dump car, the combination with a car body having a bottom furnished with a discharge opening, of two doors partially closing said opening hinged to the car body at opposite parallel edges of said opening, an intermediate door extending entirely across said opening and hinged to the car body at right angles to said first mentioned doors, substantially as specified.

6. In a dump car, the combination with a car body having a discharge opening, of two transversely hinged doors, each partially closing said opening and an intermediate longitudinally hinged door extending entirely across said discharge opening, substantially as specified.

ARGYLE CAMPBELL.

Witnesses:
H. M. MUNDAY,
PEARL ABRAMS.